H. GIBBS.
VALVED NOZZLE.
APPLICATION FILED MAY 10, 1912.
1,170,809.
Patented Feb. 8, 1916.
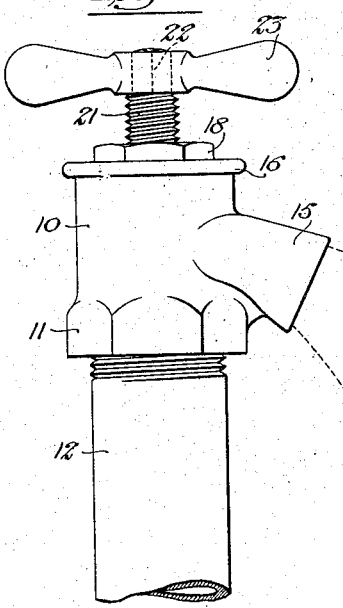
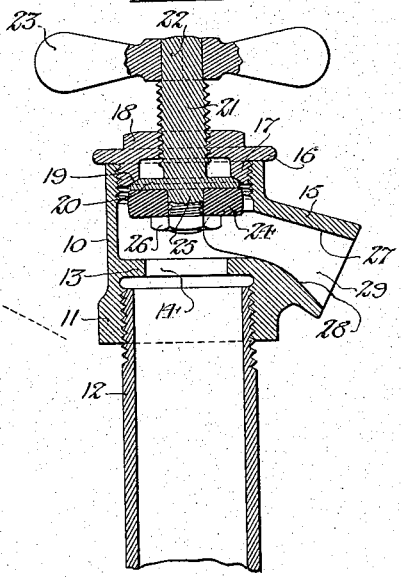
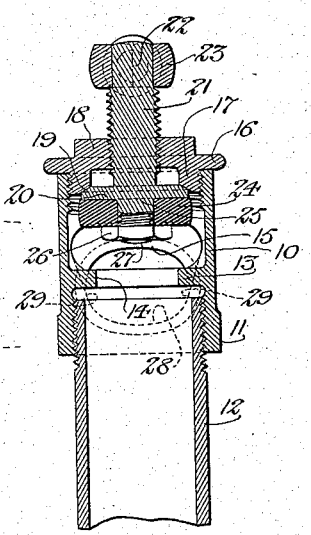
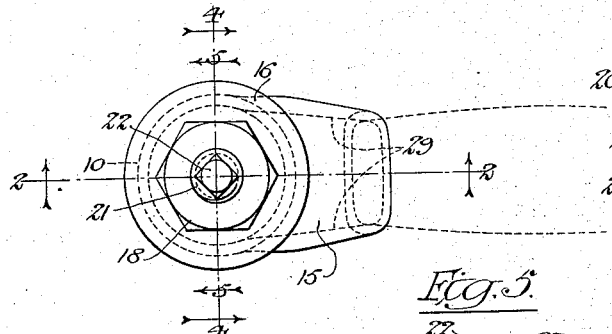
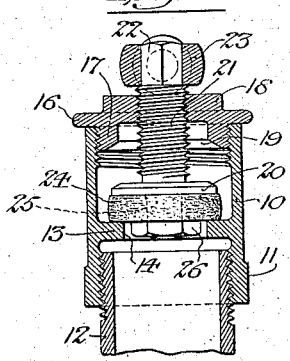
Witnesses:-
Inventor:-
Henry Gibbs
by:- Peirce, Fisher & Clapp
Attys:- ns
UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

VALVED NOZZLE.

1,170,809.   Specification of Letters Patent.   Patented Feb. 8, 1916.

Application filed May 10, 1912. Serial No. 696,329.

*To all whom it may concern:*

Be it known that I, HENRY GIBBS, a citizen of the United States, and a resident of Chicago, county of Cook, and State of Illinois, have invented certain new and useful Improvements in Valved Nozzles, of which the following is a full, clear, and exact description.

The invention relates to valved nozzles and more particularly to such nozzles as are arranged at the outlets of an irrigation system for distributing the water into troughs or "laterals," as they are called, formed in the ground.

The invention seeks to provide a simple construction of valved nozzle which can be economically manufactured, which obviates the necessity of employing a stuffing box and which can be quickly opened and closed.

A further object of the invention is to provide a construction which will deliver water into the trough or "lateral" in the ground in a narrow fan-shaped spray.

The invention consists in the features of improvement hereinafter set forth, illustrated in the preferred form in the accompanying drawings and particularly pointed out in the appended claims.

In the drawings, Figure 1 is a view in side elevation of the improved valved nozzle. Fig. 2 is a longitudinal section on the line 2—2 of Fig. 3. Fig. 3 is a plan view with the handle removed. Figs. 4 and 5 are longitudinal sections at right angles to the section shown in Fig. 2 and looking in opposite directions as indicated by the arrows 4—4 and 5—5, respectively, of Fig. 3. In Figs. 2 and 4, the valve is shown in open position, and in Fig. 5, it is shown in closed position.

The improved valved nozzle comprises a casing 10 which is preferably in the form of a short, upright cylinder. The casing is internally threaded at its opposite ends and is preferably provided at its lower end with a hexagonal portion 11, so that it may be readily threaded upon the upper end of a vertical pipe 12. Above its lower threaded portion, the casing is provided with an inwardly projecting flange or shoulder 13 forming a valve seat and having a port 14 therein. On one side, the casing is provided with a short, integral, laterally projecting spout 15 which leads from the chamber of the valve casing above the valve seat 13 and is turned or inclined downwardly to direct the water passing therethrough upon the ground. The upper end of the valve casing is closed by a cap 16 which is provided on its inner face with an inwardly extending annular shoulder 17 that projects within the upper end of the casing and is externally threaded, as shown, to engage the threads thereof. The cap is preferably provided on its upper face with a hexagonal boss 18 by which it may be firmly screwed to position with the edge portions of the cap overlapping the upper edge of the casing.

The flange 17 is provided at its lower or inner end with a conical valve seat 19 arranged above the inner end of the passage through the discharge spout 15. A disk valve 20 is arranged in the valve casing between the valve seats 13 and 19. The valve is provided with an integral, upwardly extending stem 21 which is loosely threaded through a central opening in the cap 16 and which is provided at its upper end with a reduced square portion 22. A handle 23 is suitably fitted upon and secured to the upper end portion 22 of the stem. In the preferred form shown, the disk valve 20 is provided on its upper side and adjacent its periphery with an annular, conical surface which snugly fits the conical valve seat 19 at the inner end of the cap flange 17 when the valve is in open position, as shown in Figs. 2 and 4. The engagement of the valve in open position with the valve seat 19 prevents leaking around the stem 21 and obviates the necessity of employing a stuffing box about the stem. This arrangement not only reduces the cost of construction, but inasmuch as the valve stem is not subjected to the friction of the packing in a stuffing box, the valve may be very quickly opened and closed. This is an item of importance, since irrigation systems employ a very great many of these distributing valved nozzles which must be opened and closed at frequent intervals. To secure a tight joint between the valve and the seat 13 when the valve is closed, the valve is preferably provided on its under face with a thick washer 24 of leather or the like, which is mounted on a projecting central stud 25 on the under side of the valve and is held in place in the usual manner by a nut 26 threaded on the end of the stud. In the closed position of the valve, the washer rests upon the upper face of the valve seat 13, as shown in Fig. 5.

The inner end of the discharge passage through the spout is relatively narrow or contracted in vertical direction, so that the valve casing can be correspondingly short, and so that the extent of movement necessary to fully open the valve is reduced. To provide for a full flow through the discharge passage, its inlet end is elongated in horizontal direction and is substantially equal in width to the interior diameter of the casing. The outer end of this passage is wider in vertical direction than its inner end and narrower in horizontal direction, as indicated in Figs. 2, 3, and 4, so that the walls of this passage diverge in vertical direction and converge in horizontal direction from its inner to its outer end. That is to say, the top and bottom walls 27 and 28 diverge, as indicated in Fig. 2, while the side walls of the discharge passage converge, as most clearly indicated in Fig. 3. Preferably, also, the bottom wall 28 is convexed or curved outwardly and downwardly, as shown in Fig. 2, while the side and top walls of the passage are substantially straight in longitudinal direction.

In practice it has been found that this peculiarly shaped nozzle will discharge the water in a stream or spray which is fan-shaped in a vertical plane passing through the axis of the pipe 12 upon which the valve is mounted, as indicated in dotted lines in Fig. 1, but which is contracted or narrow in horizontal direction or in a direction at right angles to the axis of the pipe 12, as indicated in dotted lines in Fig. 3.

In an irrigation system the valve nozzles are arranged upon a number of branch pipes extending upwardly from a horizontal main pipe. Troughs or "laterals" are formed in the ground opposite each branch pipe. These troughs are usually six or eight inches wide and it is desirable to deliver all of the water from one of the nozzles into the trough, so that the water may not be wasted. At the same time, it is desirable that the water shall not be delivered in a solid stream which would wash away the soil. The present improved nozzle, as stated, delivers a spray which is narrow in horizontal direction, so that the water will properly fall into the trough or "lateral" without waste, but which is fan-shaped in a vertical plane so that the water is not delivered in a solid stream.

It is obvious that changes may be made in the details set forth without departure from the essentials of the invention as defined in the claims.

I claim as my invention:

1. A valved nozzle comprising an upright casing having a coupling at its lower end, a removable cap at its upper end and a laterally projecting, down-turned discharge spout, a valve in said casing having a stem threaded through said cap, said valve being vertically movable across the inner end of the discharge passage through said spout for opening and closing the same, the passage through said down-turned discharge spout being elongated transversely and contracted vertically at its inner end and having top and bottom walls which diverge and side walls which converge from its inner to its outer end, whereby a fan-shaped spray is projected downwardly from said spout in a vertical plane extending through the axis of said upright casing, substantially as described.

2. A valved nozzle comprising an upright casing adapted to be mounted upon the upper end of a vertical supply pipe and having a laterally projecting, down-turned discharge spout and an internal shoulder forming a valve seat below the inner end of the said spout, a valve in said casing vertically movable across the inner end of the discharge passage through said spout for opening and closing the same, the passage through said down-turned discharge spout being elongated transversely and contracted vertically at its inner end and having top and bottom walls which diverge and side walls which converge from its inner to its outer end, whereby a fan-shaped spray is projected downwardly from said spout in a vertical plane, substantially as described.

HENRY GIBBS.

Witnesses:
 ELEANOR HAGENOW,
 KATHARINE GERLACH.

Copies of this patent may be obtained for five cents each, by addressing the "Commissioner of Patents, Washington, D. C."